United States Patent
Koide et al.

(10) Patent No.: US 9,527,766 B2
(45) Date of Patent: Dec. 27, 2016

(54) OPTICAL GLASS, OPTICAL ELEMENT, OPTICAL SYSTEM, AND OPTICAL DEVICE

(71) Applicant: NIKON CORPORATION, Tokyo (JP)

(72) Inventors: Tetsuya Koide, Yokohama (JP); Hiroshi Yamamoto, Yamato (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/520,583

(22) Filed: Oct. 22, 2014

(65) Prior Publication Data

US 2015/0065330 A1    Mar. 5, 2015

Related U.S. Application Data

(63) Continuation of application No. PCT/JP2013/057528, filed on Mar. 15, 2013.

(30) Foreign Application Priority Data

Apr. 27, 2012  (JP) ................ 2012-102615

(51) Int. Cl.
C03C 3/064 (2006.01)
C03C 3/066 (2006.01)
G02B 1/00 (2006.01)
G02B 27/00 (2006.01)

(52) U.S. Cl.
CPC ............... C03C 3/066 (2013.01); C03C 3/064 (2013.01); G02B 1/00 (2013.01); G02B 27/0062 (2013.01)

(58) Field of Classification Search
CPC .......... C03C 3/066; C03C 3/064; G02B 1/00; G02B 27/0062
See application file for complete search history.

(56) References Cited

U.S. PATENT DOCUMENTS

| | | | |
|---|---|---|---|
| 3,529,980 A | 9/1970 | Bromer et al. | |
| 3,999,997 A | 12/1976 | Faulstich et al. | |
| 4,055,435 A | 10/1977 | Sagara | |
| 4,824,809 A | 4/1989 | Grabowski et al. | |
| 6,380,112 B1 | 4/2002 | Kolberg et al. | |
| 2001/0003724 A1 | 6/2001 | Yamaguchi et al. | |
| 2002/0172513 A1 | 11/2002 | Kido et al. | |
| 2007/0123411 A1* | 5/2007 | Mori ................ | C03C 3/066 501/73 |

FOREIGN PATENT DOCUMENTS

| | | |
|---|---|---|
| GB | 1141627 | 1/1969 |
| JP | 50-18007 | 6/1975 |
| JP | 61-83645 | 4/1986 |
| JP | 2004-244226 | 9/2004 |
| JP | 4610046 | 1/2011 |

OTHER PUBLICATIONS

International Search Report mailed Jun. 18, 2013, in corresponding International Patent Application No. PCT/JP2013/057528.
Extended European Search Report dated Nov. 2, 2015 in corresponding European Patent Application No. 13780509.9, 10 pages.
Chinese Office Action dated Dec. 1, 2015 in corresponding Chinese Patent Application No. 201380021445.1, 12 pages.
Japanese Office Action dated May 17, 2016 in corresponding Japanese Patent Application No. 2014-512419.
European Office Action dated Jul. 20, 2016 in corresponding European Patent Application No. 13 780 509.9.
Chinese Office Action dated Jun. 21, 2016 in corresponding Chinese Patent Application No. 201380021445.1.
Chinese Office Action dated Oct. 18, 2016 in corresponding Chinese Patent Application No. 201380021445.1.

* cited by examiner

Primary Examiner — Elizabeth A Bolden

(57) ABSTRACT

An optical glass includes, in weight percent: 15% to 36% of $SiO_2$; 13% to 31% of $B_2O_3$; 4% to 27% of $Al_2O_3$; 0% to 19% of $Ta_2O_5$; 0% to 10% of $ZrO_2$; and 0% to 10% of $Nb_2O_5$; wherein $Ta_2O_5+Nb_2O_5+ZrO_2 \geq 7.1\%$; and has optical constants including a refractive index $n_d$ between 1.54 and less than 1.61 and an Abbe number $v_d$ in the range of 50 to 57; and wherein $\Delta P_{g,F}$ that denotes the anomalous dispersion is $-0.004$ or less.

8 Claims, 10 Drawing Sheets

FIG.1

| COMPONENTS wt% | | EMBODIMENT #1 | EMBODIMENT #2 | EMBODIMENT #3 | EMBODIMENT #4 | EMBODIMENT #5 | EMBODIMENT #6 |
|---|---|---|---|---|---|---|---|
| | SiO₂ | 20.89 | 21.80 | 28.89 | 24.12 | 21.63 | 22.64 |
| | B₂O₃ | 30.26 | 27.72 | 24.24 | 23.66 | 19.86 | 20.79 |
| | Li₂O | 1.31 | 1.37 | 0.89 | 1.35 | 0.70 | 0.73 |
| | Na₂O | | | | | | |
| | K₂O | 4.31 | 4.50 | 2.98 | 4.46 | 2.40 | 2.51 |
| | MgO | | 2.23 | 2.26 | 2.21 | 4.42 | 4.63 |
| | CaO | | | | | | |
| | SrO | | | | | | |
| | BaO | 14.38 | 15.01 | 15.24 | 14.88 | 14.89 | 15.59 |
| | ZnO | 3.29 | 3.43 | 3.48 | | 7.87 | 8.23 |
| | Al₂O₃ | 8.65 | 9.02 | 6.87 | 14.53 | 13.43 | 9.37 |
| | ZrO₂ | 2.61 | | | | | |
| | Nb₂O₅ | | | | | | |
| | Ta₂O₅ | 14.05 | 14.66 | 14.89 | 14.53 | 14.54 | 15.23 |
| | Sb₂O₃ | 0.25 | 0.26 | 0.26 | 0.26 | 0.26 | 0.27 |
| | Total | 100.00 | 100.00 | 100.00 | 100.00 | 100.00 | 100.00 |
| (B₂O₃)/(SiO₂+Al₂O₃×2+ZrO₂×2.5) | | 0.68 | 0.70 | 0.57 | 0.44 | 0.41 | 0.50 |
| nd | | 1.585447 | 1.581380 | 1.578141 | 1.570989 | 1.600197 | 1.605261 |
| nC | | 1.582026 | 1.578046 | 1.574835 | 1.567727 | 1.596683 | 1.601697 |
| nF | | 1.593296 | 1.589019 | 1.585724 | 1.578460 | 1.608291 | 1.613470 |
| ng | | 1.599466 | 1.595028 | 1.591683 | 1.584330 | 1.614683 | 1.619960 |
| vd | | 51.95 | 52.98 | 53.09 | 53.20 | 51.71 | 51.41 |
| Pg,F | | 0.5475 | 0.5476 | 0.5472 | 0.5469 | 0.5507 | 0.5513 |
| ΔPg,F | | -0.0085 | -0.0066 | -0.0068 | -0.0069 | -0.0057 | -0.0056 |
| WATER RESISTANCE POWDER METHOD | | RATING 4 | RATING 4 | RATING 3 | RATING 3 | RATING 3 | RATING 3 |
| λ 80/nm | | 354 | 354 | 354 | 356 | 368 | 368 |

FIG.2

| COMPONENTS wt% | | EMBODIMENT #7 | EMBODIMENT #8 | EMBODIMENT #9 | EMBODIMENT #10 | EMBODIMENT #11 | EMBODIMENT #12 |
|---|---|---|---|---|---|---|---|
| | SiO$_2$ | 22.96 | 23.91 | 23.73 | 17.29 | 16.54 | 16.69 |
| | B$_2$O$_3$ | 21.09 | 23.45 | 23.27 | 26.60 | 25.44 | 25.66 |
| | Li$_2$O | 0.74 | 1.34 | 1.33 | 1.39 | 1.33 | 1.34 |
| | Na$_2$O | | | | | | |
| | K$_2$O | 2.55 | 4.42 | 4.39 | 6.69 | 6.40 | 6.45 |
| | MgO | 3.29 | 3.07 | 2.17 | 0.45 | 0.43 | 0.44 |
| | CaO | | | | | | 1.82 |
| | SrO | | | | | | 3.37 |
| | BaO | 15.81 | 14.75 | 16.28 | 8.36 | 7.99 | 6.40 |
| | ZnO | 8.35 | | | | 4.37 | |
| | Al$_2$O$_3$ | 9.50 | 14.40 | 14.29 | 24.06 | 23.01 | 23.21 |
| | ZrO$_2$ | | | | | | |
| | Nb$_2$O$_5$ | | | | | | |
| | Ta$_2$O$_5$ | 15.44 | 14.41 | 14.29 | 14.90 | 14.24 | 14.37 |
| | Sb$_2$O$_3$ | 0.27 | 0.25 | 0.25 | 0.26 | 0.25 | 0.25 |
| | Total | 100.00 | 100.00 | 100.00 | 100.00 | 100.00 | 100.00 |
| (B$_2$O$_3$)/(SiO$_2$+Al$_2$O$_3$×2+ZrO$_2$×2.5) | | 0.50 | 0.44 | 0.44 | 0.41 | 0.41 | 0.41 |
| nd | | 1.602452 | 1.572030 | 1.572757 | 1.556649 | 1.564953 | 1.562271 |
| nC | | 1.598895 | 1.568771 | 1.569499 | 1.553494 | 1.561724 | 1.559081 |
| nF | | 1.610637 | 1.579499 | 1.580253 | 1.563871 | 1.572352 | 1.569607 |
| ng | | 1.617110 | 1.585365 | 1.586143 | 1.569541 | 1.578167 | 1.575367 |
| vd | | 51.31 | 53.32 | 53.26 | 53.64 | 53.16 | 53.42 |
| Pg,F | | 0.5513 | 0.5468 | 0.5477 | 0.5464 | 0.5471 | 0.5472 |
| ΔPg,F | | -0.0058 | -0.0069 | -0.0061 | -0.0067 | -0.0068 | -0.0063 |
| WATER RESISTANCE POWDER METHOD | | RATING 3 | RATING 3 | RATING 3 | RATING 3 | RATING 3 | RATING 3 |
| λ 80/nm | | 362 | 357 | 354 | 358 | 357 | 357 |

FIG.3

| COMPONENTS wt% | | EMBODIMENT #13 | EMBODIMENT #14 | EMBODIMENT #15 | EMBODIMENT #16 | EMBODIMENT #17 | EMBODIMENT #18 |
|---|---|---|---|---|---|---|---|
| | $SiO_2$ | 14.30 | 19.55 | 18.92 | 19.90 | 18.72 | 20.06 |
| | $B_2O_3$ | 24.92 | 26.92 | 28.20 | 31.00 | 27.90 | 22.79 |
| | $Li_2O$ | 1.30 | 1.41 | 1.27 | 1.34 | 1.26 | 1.31 |
| | $Na_2O$ | | | | | | 4.14 |
| | $K_2O$ | 6.27 | 6.77 | 6.13 | 6.44 | 6.06 | |
| | $MgO$ | 0.42 | 0.46 | 0.83 | 1.90 | 0.82 | 2.12 |
| | $CaO$ | 1.77 | 1.91 | 1.73 | 2.73 | 1.71 | |
| | $SrO$ | | 3.54 | 4.10 | 3.34 | 4.06 | |
| | $BaO$ | 11.06 | 6.71 | 4.72 | | 4.67 | 15.95 |
| | $ZnO$ | | | | | | |
| | $Al_2O_3$ | 25.76 | 17.39 | 24.12 | 25.37 | 23.86 | 19.38 |
| | $ZrO_2$ | | | 1.50 | 1.66 | 1.48 | |
| | $Nb_2O_5$ | | | | 6.06 | 2.40 | |
| | $Ta_2O_5$ | 13.96 | 15.08 | 8.23 | | 6.81 | 14.00 |
| | $Sb_2O_3$ | 0.24 | 0.26 | 0.25 | 0.26 | 0.25 | 0.25 |
| | Total | 100.00 | 100.00 | 100.00 | 100.00 | 100.00 | 100.00 |
| $(B_2O_3)/(SiO_2+Al_2O_3\times2+ZrO_2\times2.5)$ | | 0.38 | 0.50 | 0.40 | 0.41 | 0.40 | 0.39 |
| nd | | 1.566759 | 1.564140 | 1.550972 | 1.551546 | 1.556833 | 1.568549 |
| nC | | 1.563536 | 1.560925 | 1.547967 | 1.548454 | 1.553711 | 1.565283 |
| nF | | 1.574147 | 1.571520 | 1.557809 | 1.558603 | 1.563955 | 1.576039 |
| ng | | 1.579954 | 1.577318 | 1.563150 | 1.564150 | 1.569547 | 1.581931 |
| vd | | 53.41 | 53.25 | 55.98 | 54.34 | 54.36 | 52.86 |
| Pg,F | | 0.5473 | 0.5472 | 0.5427 | 0.5466 | 0.5459 | 0.5478 |
| ΔPg,F | | -0.0062 | -0.0065 | -0.0065 | -0.0054 | -0.0060 | -0.0067 |
| WATER RESISTANCE POWDER METHOD | | RATING 3 | RATING 3 | RATING 3 | RATING 3 | RATING 3 | RATING 3 |
| λ 80/nm | | 359 | 357 | 357 | 366 | 360 | 356 |

FIG.4

| | | EMBODIMENT #19 | EMBODIMENT #20 | EMBODIMENT #21 | EMBODIMENT #22 | EMBODIMENT #23 | EMBODIMENT #24 |
|---|---|---|---|---|---|---|---|
| COMPONENTS wt% | $SiO_2$ | 18.33 | 17.55 | 17.24 | 15.14 | 16.99 | 35.12 |
| | $B_2O_3$ | 28.55 | 27.34 | 26.86 | 20.85 | 23.40 | 24.32 |
| | $Li_2O$ | 1.23 | 1.18 | 1.16 | 1.02 | 5.28 | 1.66 |
| | $Na_2O$ | | | | | | |
| | $K_2O$ | 5.93 | 5.68 | 5.58 | 4.90 | 5.50 | 5.47 |
| | MgO | | 5.32 | 0.76 | 0.66 | 0.74 | 2.71 |
| | CaO | 3.63 | 2.41 | 8.59 | | | |
| | SrO | 5.53 | 5.29 | 5.20 | | | |
| | BaO | | | | 27.00 | 13.95 | 18.23 |
| | ZnO | | | | | | |
| | $Al_2O_3$ | 23.37 | 22.37 | 21.98 | 19.31 | 21.67 | 4.11 |
| | $ZrO_2$ | | | | | | |
| | $Nb_2O_5$ | | | | | | |
| | $Ta_2O_5$ | 13.19 | 12.63 | 12.40 | 10.91 | 12.25 | 8.07 |
| | $Sb_2O_3$ | 0.24 | 0.23 | 0.23 | 0.19 | 0.22 | 0.31 |
| | Total | 100.00 | 100.00 | 100.00 | 100.00 | 100.00 | 100.00 |
| $(B_2O_3)/(SiO_2+Al_2O_3\times 2+ZrO_2\times 2.5)$ | | 0.44 | 0.44 | 0.44 | 0.39 | 0.39 | 0.56 |
| nd | | 1.555109 | 1.563600 | 1.572303 | 1.579072 | 1.568949 | 1.559949 |
| nC | | 1.552001 | 1.560462 | 1.569105 | 1.575792 | 1.565742 | 1.557029 |
| nF | | 1.562192 | 1.570756 | 1.579602 | 1.586612 | 1.576296 | 1.566582 |
| ng | | 1.567746 | 1.576359 | 1.585324 | 1.592546 | 1.582064 | 1.571740 |
| vd | | 54.47 | 54.75 | 54.52 | 53.52 | 53.91 | 58.61 |
| Pg,F | | 0.5450 | 0.5443 | 0.5451 | 0.5484 | 0.5465 | 0.5399 |
| ΔPg,F | | -0.0067 | -0.0069 | -0.0065 | -0.0049 | -0.0061 | -0.0047 |
| WATER RESISTANCE POWDER METHOD | | RATING 3 | RATING 3 | RATING 3 | RATING 3 | RATING 3 | RATING 3 |
| λ80/nm | | 353 | 365 | 351 | 349 | 351 | 341 |

FIG.7

| COMPONENTS | | COMPARISON EXAMPLE #1 | COMPARISON EXAMPLE #2 | COMPARISON EXAMPLE #3 | COMPARISON EXAMPLE #4 | COMPARISON EXAMPLE #5 | COMPARISON EXAMPLE #6 |
|---|---|---|---|---|---|---|---|
| wt% | $SiO_2$ | 14.73 | 21.34 | 33.20 | 27.57 | 16.07 | 22.20 |
| | $B_2O_3$ | 26.93 | 32.30 | 12.13 | 32.24 | 22.12 | 32.15 |
| | $Li_2O$ | 1.33 | 1.37 | 1.49 | 1.36 | 1.08 | 1.39 |
| | $Na_2O$ | | | | | | |
| | $K_2O$ | 4.37 | 4.52 | 4.89 | 4.49 | 5.20 | 4.58 |
| | $MgO$ | 4.33 | 1.34 | 4.84 | | 0.70 | 2.27 |
| | $CaO$ | | | | | | |
| | $SrO$ | | | | | | |
| | $BaO$ | 22.82 | 15.06 | 19.99 | 14.96 | 27.11 | 15.28 |
| | $ZnO$ | 7.70 | 3.44 | 4.89 | | 3.49 | 3.49 |
| | $Al_2O_3$ | 3.29 | 5.66 | 9.80 | 4.50 | 20.49 | 3.45 |
| | $ZrO_2$ | | | | | | |
| | $Nb_2O_5$ | | | | | | |
| | $Ta_2O_5$ | 14.25 | 14.71 | 8.49 | 14.62 | 7.02 | 14.93 |
| | $Sb_2O_3$ | 0.25 | 0.26 | 0.28 | 0.26 | 0.21 | 0.26 |
| | Total | 100.00 | 100.00 | 100.00 | 100.00 | 100.00 | 100.00 |
| $(B_2O_3)/(SiO_2+Al_2O_3 \times 2+ZrO_2 \times 2.5)$ | | 1.26 | 0.99 | 0.23 | 0.88 | 0.39 | 1.10 |
| nd | | 1.615839 | 1.571378 | 1.577684 | 1.556441 | 1.578259 | 1.589000 |
| nC | | 1.612241 | 1.568129 | 1.574515 | 1.553322 | 1.574879 | 1.585650 |
| nF | | 1.624129 | 1.578822 | 1.584991 | 1.563572 | 1.586084 | 1.596643 |
| ng | | 1.630674 | 1.584657 | 1.590721 | 1.569148 | 1.592291 | 1.602666 |
| vd | | 51.80 | 53.43 | 55.14 | 54.29 | 51.61 | 53.58 |
| Pg,F | | 0.5506 | 0.5457 | 0.5470 | 0.5440 | 0.5539 | 0.5479 |
| ΔPg,F | | -0.0057 | -0.0078 | -0.0036 | -0.0080 | -0.0026 | -0.0053 |
| WATER RESISTANCE POWDER METHOD | | RATING 4 | RATING 4 | RATING 3 | RATING 4 | RATING 3 | RATING 4 |
| λ80/nm | | 362 | 348 | 357 | 330 | 369 | 346 |

FIG.8

| COMPONENTS wt% | | COMPARISON EXAMPLE #7 | COMPARISON EXAMPLE #8 | COMPARISON EXAMPLE #9 | COMPARISON EXAMPLE #10 | COMPARISON EXAMPLE #11 |
|---|---|---|---|---|---|---|
| | SiO2 | 25.00 | 21.59 | 21.03 | 32.18 | 21.40 |
| | B2O3 | 32.44 | 31.28 | 30.46 | 24.80 | 19.65 |
| | Li2O | 1.41 | 1.35 | 1.32 | 1.42 | 1.34 |
| | Na2O | | | | | |
| | K2O | 4.63 | 4.46 | 4.34 | 4.68 | 4.42 |
| | MgO | 2.29 | 2.21 | 2.15 | 2.32 | 4.38 |
| | CaO | | | | | |
| | SrO | | | | | |
| | BaO | 15.42 | 14.87 | 14.48 | 15.59 | 23.06 |
| | ZnO | | 3.40 | 3.31 | | 7.78 |
| | Al2O3 | 3.48 | 3.35 | 3.26 | 3.51 | 3.32 |
| | ZrO2 | | 2.70 | 5.26 | | |
| | Nb2O5 | | | | | |
| | Ta2O5 | 15.07 | 14.53 | 14.14 | 15.23 | 14.40 |
| | Sb2O3 | 0.26 | 0.26 | 0.25 | 0.27 | 0.25 |
| | Total | 100.00 | 100.00 | 100.00 | 100.00 | 100.00 |
| (B2O3)/(SiO2+Al2O3×2+ZrO2×2.5) | | 1.02 | 0.89 | 0.75 | 0.63 | 0.70 |
| nd | | 1.578520 | 1.584814 | 1.603282 | 1.577001 | 1.624912 |
| nC | | 1.575261 | 1.581425 | 1.599716 | 1.573763 | 1.621241 |
| nF | | 1.585942 | 1.592589 | 1.611486 | 1.584409 | 1.633401 |
| ng | | 1.591766 | 1.598701 | 1.617948 | 1.590223 | 1.640111 |
| vd | | 54.16 | 52.38 | 51.26 | 54.20 | 51.39 |
| Pg,F | | 0.5453 | 0.5475 | 0.5490 | 0.5461 | 0.5518 |
| ΔPg,F | | -0.0070 | -0.0078 | -0.0081 | -0.0060 | -0.0051 |
| WATER RESISTANCE POWDER METHOD | | RATING 4 | RATING 4 | RATING 4 | RATING 4 | RATING 4 |
| λ 80/nm | | 344 | 350 | 351 | 342 | 358 |

OPTICAL GLASS, OPTICAL ELEMENT, OPTICAL SYSTEM, AND OPTICAL DEVICE

INCORPORATION BY REFERENCE

This application is a continuation of International Application No. PCT/JP2013/057528 filed Mar. 15, 2013, and is based upon and claims the foreign priority of Japanese Patent Application No. 2012-102615 filed Apr. 7, 2012.

The disclosures of the following priority applications are herein incorporated by references:

Japanese Patent Application No. 2012-102615 filed Apr. 27, 2012.

International Application No. PCT/JP2013/057528 filed Mar. 15, 2013.

BACKGROUND OF THE INVENTION

1. Field of the Invention

The present invention relates to an optical glass, to an optical element, to an optical system, and to an optical device.

2. Description of Related Art

Japanese Patent 4,610,046 disclosed that an optical glass that does not contain PbO, that has predetermined optical constants including refractive index $n_d$ of 1.52 to 1.58 and Abbe number $v_d$ of 50 to 57, and that has a negative anomalous dispersion.

SUMMARY OF INVENTION

However, since there has been no optical glass having negative anomalous dispersion extending from the short visible wavelength region to the ultraviolet region and moreover whose chemical durability is sufficient, accordingly, for light having color in this region, there has been the problem that it has not been possible to produce an optical design in which the residual color aberration, which appears as a secondary spectrum, is sufficiently eliminated.

According to the 1st aspect of the present invention, an optical glass includes, in weight percent: 15% to 36% of $SiO_2$; 13% to 31% of $B_2O_3$; 4% to 27% of $Al_2O_3$; 0% to 19% of $Ta_2O_5$; 0% to 10% of $ZrO_2$; and 0% to 10% of $Nb_2O_5$; wherein $Ta_2O_5+Nb_2O_5+ZrO_2 \geq 7.1\%$; and has optical constants including a refractive index $n_d$ between 1.54 and less than 1.61 and an Abbe number $v_d$ in the range of 50 to 57; and wherein $\Delta P_{g,F}$ that denotes the anomalous dispersion is -0.004 or less.

According to the 2nd aspect of the present invention, the optical glass according to the 1st aspect may include: 0% to 5% of $Li_2O$; 0% to 4% of $Na_2O$; 0% to 7% of $K_2O$; 0% to 5% of MgO; 0% to 8% of CaO; 0% to 15% of SrO; 0% to 27% of BaO, wherein MgO+CaO+SrO+BaO≤29%; and 0% to 12% of ZnO.

According to the 3rd aspect of the present invention, it is preferred that in the optical glass according to the 2nd aspect, in oxide based weight percent, the value of (included amount of $B_2O_3$ component)/(included amount of $SiO_2$ component+included amount of $Al_2O_3$ component×2+included amount of $ZrO_2$ component×2.5) is between 0.25 and 0.62 inclusive.

According to the 4th aspect of the present invention, it is preferred that in the optical glass according to the 2nd aspect, in oxide based weight percent, the value of (included amount of $B_2O_3$ component)/(included amount of $SiO_2$ component+included amount of $Al_2O_3$ component×2+included amount of $ZrO_2$ component×2.5) is between 0.25 and 0.62 inclusive, and the optical glass has a chemical durability of water resistance rating 3 or higher, as measured on the basis of "Method (powder method) for measuring the chemical durability of an optical glass" (Japanese Optical Glass Industrial Standard JOGIS 06-2008).

According to the 5th aspect of the present invention, the optical glass according to the 3rd aspect may have a chemical durability of water resistance rating 3 or higher, as measured on the basis of "Method (powder method) for measuring the chemical durability of an optical glass" (Japanese Optical Glass Industrial Standard JOGIS 06-2008).

According to the 6th aspect of the present invention, it is preferred that in the optical glass according to the 1st aspect, for thickness 10 mm, the optical wavelength at which the internal transmittance is 80% is 380 nm or less.

According to the 7th aspect of the present invention, an optical element may be made from an optical glass according to the 1st aspect.

According to the 8th aspect of the present invention, an optical system may comprise an optical element according to the 7th aspect.

According to the 9th aspect of the present invention, an optical device may comprise an optical system according to the 8th aspect.

According to the present invention, it is possible for an optical glass of the $SiO_2$—$B_2O_3$—$Al_2O_3$—($Ta_2O_5$, $ZrO_2$, $Nb_2O_5$) series to have optical constants including refractive index $n_d$ of 1.54 to less than 1.61 and an Abbe number $v_d$ of 50 to 57, and to have a negative anomalous dispersion.

BRIEF DESCRIPTION OF DRAWINGS

FIG. 1 is a figure showing optical glass characteristics for first through sixth embodiments of the present invention;

FIG. 2 is a figure showing optical glass characteristics for seventh through twelfth embodiments of the present invention;

FIG. 3 is a figure showing optical glass characteristics for thirteenth through eighteenth embodiments of the present invention;

FIG. 4 is a figure showing optical glass characteristics for nineteenth through twenty-fourth embodiments of the present invention;

FIG. 7 is a figure showing characteristics of optical glasses of first through sixth comparison examples;

FIG. 8 is a figure showing characteristics of optical glasses of seventh through eleventh comparison examples.

DESCRIPTION OF PREFERRED EMBODIMENTS

Figure 5:
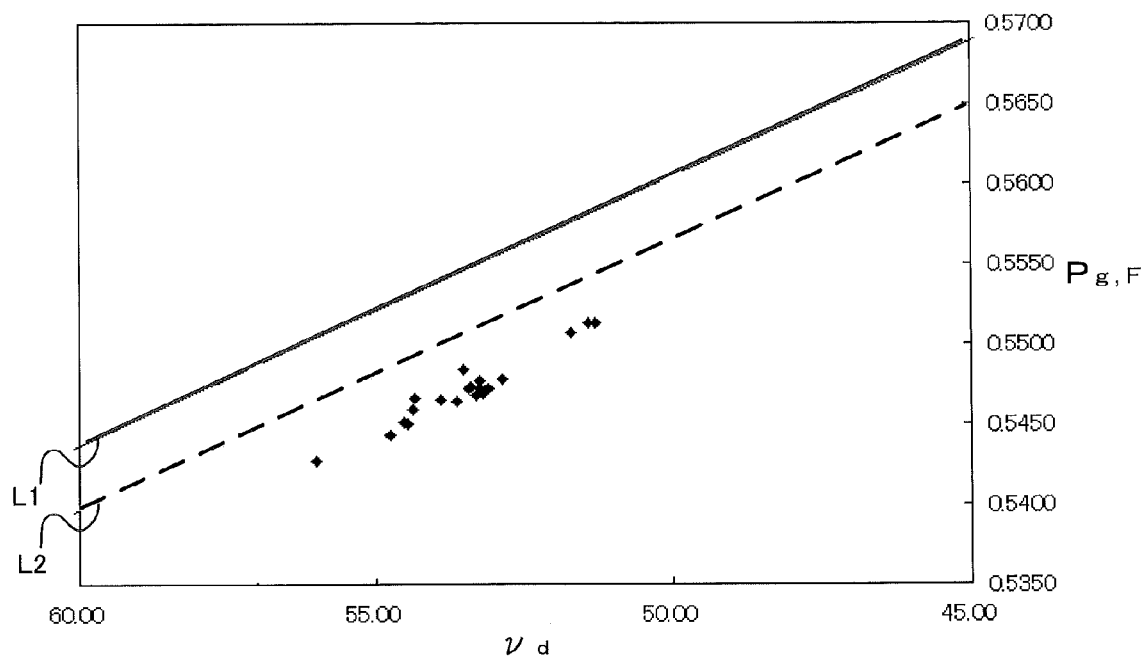
FIG. 5 is a figure explaining of optical constants of the optical glasses according to the first through the twenty-fourth embodiments.

Optical glasses according to various embodiments of the present invention will now be explained with reference to the drawings. The optical glass according to the present invention is an optical glass in a specified composition region of the $SiO_2$—$B_2O_3$—$Al_2O_3$—($Ta_2O_5$, $ZrO_2$, $Nb_2O_5$) series that does not substantially contain any substances such as PbO or $As_2O_3$ which can contaminate the environment. Here, "does not substantially contain" means that no substantial compositional component having an influence upon the characteristics of the glass composite material is included as an impurity, above a density thereof that is unavoidably included. This optical glass has high chemical durability, and exhibits a large negative anomalous dispersion in the ultraviolet region from the short wavelength side of the visible region. In the following explanation, $n_d$ denotes the refractive index of the glass for light of wavelength 587.562 nm. Furthermore, $v_d$ is given by the following Equation (1). It should be understood that $n_F$ denotes the refractive index of the glass for light of wavelength 486.133 nm, while $n_C$ denotes the refractive index of the glass for light of wavelength 656.273 nm. All these refractive indexes are the values at 22° C.

$$v_d = (n_d - 1)/(n_F - n_C) \quad (1)$$

The partial dispersion ratio ($P_{g,F}$) denotes the ratio of the partial dispersion ($n_g - n_F$) to the principal dispersion ($n_F - n_C$), and is given by the following Equation (2). It should be understood that $n_g$ denotes the refractive index of the glass for light of wavelength 435.835 nm.

$$(P_{g,F}) = (n_g - n_F)/(n_F - n_C) \quad (2)$$

The anomalous dispersion ($\Delta P_{g,F}$), denotes the deviation from a standard partial dispersion ratio line that takes, as a standard, two types of glass F2 and K7 as glasses that have normal dispersibility. In other words, in coordinates that show the partial dispersion ratio ($P_{g,F}$) along the vertical axis and the Abbe number $v_d$ along the horizontal axis, the difference in the vertical coordinate between the straight line joining these two types of glass and the value for the glass that is the subject of comparison is the deviation of the partial dispersion ratio, in other words the anomalous dispersion ($\Delta P_{g,F}$). If, in the coordinate system described above, the value of the partial dispersion ratio is positioned above the straight line that joins the two types of glass and that serves as a reference, then the glass exhibits a positive anomalous dispersion ($+\Delta P_{g,F}$), while, if this value is positioned below, then the glass exhibits a negative anomalous dispersion ($-\Delta P_{g,F}$). The optical glass according to the present invention is formed so that the negative anomalous dispersion ($-\Delta P_{g,F}$) satisfies ($\Delta P_{g,F}$)≤−0.04, as will be described hereinafter. It should be understood that, in the following explanation, when the absolute value of the value that gives the anomalous dispersion ($\Delta P_{g,F}$) is large, then this is described as the anomalous dispersion being large.

The wavelength of the light beam that passes through 10 mm thickness of a glass at an internal transmittance of 80% is termed λ80. This gives the wavelength of a light beam that passes through the glass at an internal transmittance of 80%, not including the reflection loss at the surface of the glass, as specified in Japanese Optical Glass Industrial Standard (JOGIS) "Method for measuring the internal transmittance of an optical glass". The smaller the value of λ80 is, the more satisfactory is the optical transmittance of the glass in the short wavelength side of the light beam wavelength region.

FIGS. 1 through 4 give the compositions and the optical constants of optical glasses according to first through twenty-fourth embodiments of the present invention. First, the compositional ranges for the components of these optical glasses according to the first through twenty-fourth embodiments will be explained.

As a glass forming oxide, $SiO_2$ is an essential component. If the amount of included $SiO_2$, in other words its weight percent with respect to the weight of the optical glass, is less than 15%, then the chemical durability of the optical glass becomes insufficient. Moreover, if the amount of included $SiO_2$ is greater than or equal to 36%, then the anomalous dispersion of the optical glass does not reach the target. Accordingly, the amount of included $SiO_2$ is set to be from 15% to 36%, which is a range in which both the chemical durability of the optical glass and also its anomalous dispersion become satisfactory. From the standpoint described above, as a more desirable mode, it is possible to set the lower limit value for the weight percent of the amount of included $SiO_2$ to 17%, and to set its upper limit value to 28%.

Similarly to $SiO_2$, as a glass forming oxide, $B_2O_3$ is an essential component. If the amount of included $B_2O_3$ is less than 13% in weight percent, then, along with the viscosity becoming high when the optical glass is melted, also the anomalous dispersion of the optical glass is suppressed. Moreover, if the amount of included $B_2O_3$ exceeds 31%, then the chemical durability of the optical glass is low. Accordingly, the amount of included $B_2O_3$ is set to be from 13% to 31%, which is a range in which the anomalous dispersion, the viscosity when melted, and the chemical durability of the optical glass become satisfactory. From the standpoint described above, as a more desirable mode, it is possible to set the upper limit value in weight percent of the amount of included $B_2O_3$ to 30%.

$ZrO_2$ not only increases the chemical durability of optical glass, but also provides the beneficial effects of increasing the refractive index and making the anomalous dispersion large. However, if the amount of included $ZrO_2$ exceeds 10% by weight percent, then the optical glass can easily devitrify. Due to this, the amount of included $ZrO_2$ is set to be in the range from 0% to 10%, which is a range in which the optical glass does not devitrify, and in which it can be manufactured in a stable manner. From the standpoint described above, as a more desirable mode, it is possible to set the lower limit value in weight percent of the amount of included $ZrO_2$ to 0.5%, and to set its upper limit value to 6%.

$Nb_2O_5$ provides the beneficial effect of making the anomalous dispersion of the optical glass large. Moreover, $Nb_2O_5$ is an effective component for adjusting the refractive index and the Abbe number of optical glass. However, if the amount of included $Nb_2O_5$ exceeds 10% by weight percent, then the optical glass can easily devitrify. Due to this, the amount of included $Nb_2O_5$ is set to be from 0% to 10%, which is a range in which the optical glass does not become devitrified, and in which it can be manufactured in a stable manner. From the standpoint described above, as a more desirable mode, it is possible to set the lower limit value in weight percent of the amount of included $Nb_2O_5$ to 1.5%, and to set its upper limit value to 6%.

$Li_2O$ is a component that promotes the melting of the optical glass, but, if the amount of included $Li_2O$ is greater than 5% by weight percent, then there is a tendency for the devitrification to increase. Thus, as one aspect of the present invention, 5% can be taken as the upper limit value for the amount of included $Li_2O$. Moreover, as a more desirable mode, 1% can be taken as the lower limit value for the amount of included $Li_2O$, while 3% can be taken as its upper limit value. And, while $Na_2O$ and $K_2O$ are components that promote the melting of the optical glass, they are also components that decrease the chemical durability of the optical glass. Due to this, as one aspect of the present invention, the amount of included $Na_2O$ is set to be up to 4% by weight percent, while the amount of included $K_2O$ is set to be up to 7% by weight percent. And, from the standpoint described above, as a more desirable mode, it is possible to set the lower limit value in weight percent of the amount of included $Na_2O$ to 2%, and it is possible to set its upper limit value to 3%. Moreover, it is possible to set the lower limit value in weight percent of the amount of included $K_2O$ to 2%, and it is possible to set its upper limit value to 6%.

It should be understood that, from the viewpoint of the meltability of the glass, it would also be acceptable to arrange to set the lower limit value for the amount of included $Li_2O+Na_2O+K_2O$ to 2.5% by weight percent.

MgO and CaO are components that enhance the chemical durability of optical glass, and that can adjust the refractive index and the Abbe number. However, MgO and CaO have the characteristic of easily devitrifying the optical glass. Accordingly, as one aspect of the present invention, the amount of included MgO is set to up to 5% by weight percent, while the amount of included CaO is set to up to 8% by weight percent. And, as a more desirable mode, it is possible to set the lower limit value in weight percent of the amount of included MgO to 0.5%, and it is possible to set its upper limit value to 4%. Moreover, it is possible to set the lower limit value in weight percent of the amount of included CaO to 2%, and it is possible to set its upper limit value to 6%.

While SrO is a component that can adjust the refractive index and the Abbe number of optical glass, it suppresses the anomalous dispersion of optical glass. Due to this, as one aspect of the present invention, the amount of included SrO is set to be up to 15%. And, as a more desirable mode, 3% can be taken as the lower limit value in weight percent for the amount of included SrO, while 12% can be taken as its upper limit value.

BaO is a component that increases the glass vitrification range (i.e. the range of the composition with which a glass is produced by the melting method), and that increases the anomalous dispersion of the optical glass. However, since BaO is also a component that has the effect of increasing the refractive index of the optical glass more than required, accordingly, as one aspect of the present invention, the amount of included BaO in weight percent is set to be up to 27%. And, as a more desirable mode, 4% can be taken as the lower limit value in weight percent for the amount of included BaO, while 24% can be taken as its upper limit value. And, when the balance between the anomalous dispersion and the refractive index of the optical glass is considered, the total of the included amounts in weight percent of MgO, CaO, SrO, and BaO that are described above may be taken as being 29% or less.

ZnO is a component that increases the vitrification range, but it suppresses the anomalous dispersion of the optical glass. Due to this, as one aspect of the present invention, the amount of included ZnO in weight percent is set to be up to 12%. And, as a more desirable mode, 2% can be taken as the lower limit value in weight percent for the amount of included ZnO, while 12% can be taken as its upper limit value.

$Al_2O_3$ is a component that decreases the viscosity of the molten optical glass and that also can easily cause devitrification, but it has the effect of enhancing the chemical durability of the optical glass. Due to this, there is a tendency for the chemical durability of the optical glass to decrease if the amount of included $Al_2O_3$ is less than 4% by weight percent. Moreover, if the amount of included $Al_2O_3$ is greater than 27%, then the viscosity when melted becomes great, and moreover there is a tendency towards easy devitrification. Accordingly, as one aspect of the present invention, the amount of included $Al_2O_3$ in weight percent is set to be between 4% and 27%, so that devitrification of the optical glass is avoided while obtaining sufficient chemical durability. And, as a more desirable mode, the lower limit value in weight percent for the amount of included $Al_2O_3$ can be taken as 6%, while 26% can be taken as its upper limit value.

$Ta_2O_5$ is a component that raises the refractive index of the optical glass, and that increases its anomalous dispersion. However, with $Ta_2O_5$, it is easy for non-molten inclusions to be present within the molten glass. Accordingly, as one aspect of the present invention, the amount of included $Ta_2O_5$ is set to be up to 19% in weight percent. And, as a more desirable mode, the lower limit value in weight percent for the amount of included $Ta_2O_5$ can be taken as 2%, while 15% can be taken as its upper limit value. And, in order for the anomalous dispersion of the optical glass to attain its target value, the total of the amounts of included $ZrO_2$, $Nb_2O_5$, and $Ta_2O_5$ is set to 7.1% or greater. It should be understood that $Sb_2O_3$ may be added in order to perform degassing of the optical glass, this being a per se known degassing substance. However, it is sufficient for the amount in weight percent of included $Sb_2O_3$ to be up to 3%. With the composite material of the optical glass according to the present invention, even if the weight of the added amount is 0.3% in weight percent or less, still the beneficial effect for degassing can be sufficiently obtained.

Next, with reference to FIG. 5, the optical constants of the optical glass according to the present invention will be explained. FIG. 5 shows the anomalous dispersion of the optical glass. In FIG. 5, the partial dispersion ratio ($P_{g,F}$) is shown along the vertical axis, while the Abbe number $v_d$ is shown along the horizontal axis. The straight line L1 shown by the solid line is a straight line joining the two types of glass F2 and K7. It should be understood that the Abbe number $v_d$ and the partial dispersion ratio ($P_{g,F}$) of F2 and K7 are as follows:

F2: Abbe number $v_d$=36.33, partial dispersion ratio ($P_{g,F}$) =0.5834

K7: Abbe number $v_d$=60.47, partial dispersion ratio ($P_{g,F}$) =0.5429

In FIG. 5, the partial dispersibility of each of the optical glasses according to the various embodiments is plotted. As shown in FIG. 5, the partial dispersibility of the optical glass of each embodiment is positioned below the straight line L1. In other words, the optical glasses have negative anomalous dispersion. The straight line L2 shown by the broken line in the figure shows where the anomalous dispersion ($\Delta P_{g,F}$) is −0.004. Accordingly, the anomalous dispersion ($\Delta P_{g,F}$) of the optical glasses according to the embodiments is lower than −0.004.

In FIG. 1, optical glasses according to the first and the second embodiments are shown that, along with containing components of compositional ranges described above, also have negative anomalous dispersion and optical constants as described above. In other words, the optical glasses of the first and the second embodiments have, as optical characteristics, refractive indexes $n_d$ in the range 1.54 to 1.61 and Abbe numbers $v_d$ in the range of 50 to 57, and have anomalous dispersion ($\Delta P_{g,F}$)≤−0.004. Furthermore since the optical glasses of the first and second embodiments have $\lambda 80$ of 380 nm or less, accordingly their optical transmittances are satisfactory in the ultraviolet wavelength region from the visible light wavelength region.

Correlation will now be performed of the optical glasses according to the third and fifth comparison examples shown in FIG. 7 and the optical glasses according to the first and second embodiments. With the optical glass of the third comparison example the value of the anomalous dispersion ($\Delta P_{g,F}$) is −0.0036, while with the optical glass of the fifth comparison example the value of the anomalous dispersion ($\Delta P_{g,F}$) is −0.0026. In other words, the anomalous dispersion ($\Delta P_{g,F}$) of the comparison examples described above is not below −0.004 or less and thus the anomalous dispersion is not large.

If an optical system is constructed using optical glasses of the type described above whose anomalous dispersion is not sufficient, then the following type of problem occurs. With an optical system that is constructed using optical glasses having Abbe numbers $v_d$ that are different and for which the positive and/or negative anomalous dispersion is not sufficient, even if it has been possible to eliminate color aberration for light of two colors, still it is not possible to eliminate residual color aberration for light of other colors than those two colors, and this residual color aberration appears as a secondary spectrum.

By contrast, if an optical system is constructed using optical glasses of the type described above whose anomalous dispersion is large, then this provides the following beneficial operational effects. With an optical system that is constructed using a combination of optical glasses for which the positive and/or negative anomalous dispersion is sufficiently great, not only is it possible to eliminate color aberration for light of two colors in the ultraviolet region as described above, but also it is possible to eliminate residual color aberration for light of other colors than those two colors. Accordingly, the development of the optical glasses of the first and the second embodiments, whose negative anomalous dispersion is large and that do not contain any compound such as PbO or $As_2O_3$ which is not desirable in the environment, is extremely useful in the design of optical lens systems of various types.

The structures of the optical glasses according to the third through the twenty-fourth embodiments are shown in FIGS. 1 through 4. In addition to the characteristics possessed by the optical glasses of the first and second embodiments, the optical glasses according to the third through the twenty-fourth embodiments are formulated so that, in oxide based weight percent, the following Equation (3) is satisfied. As a result, the optical glasses according to the third through the twenty-fourth embodiments have higher chemical durability. It should be understood that, in the following explanation, it will be supposed that the water resistance of the optical glass, measured on the basis of "Method (powder method) for measuring the chemical durability of an optical glass" (Japanese Optical Glass Industrial Standard JOGIS 06-2008) (hereinafter termed the powder method water resistance) is employed as an indicator for evaluation of chemical durability of these optical glasses.

$$0.25 \leq (\text{ratio of included } B_2O_3 \text{ component})/(\text{ratio of included } SiO_2 \text{ component} + \text{ratio of included } Al_2O_3 \text{ component} \times 2 + \text{ratio of included } ZrO_2 \text{ component} \times 2.5) \leq 0.62 \quad (3)$$

The present inventors have reasoned that, in the derivation of Equation (3) above, $B_2O_3$ is a component that decreases the chemical durability of the optical glass, while $SiO_2$, $Al_2O_3$, and $ZrO_2$ are components that enhance the chemical durability of the optical glass, and have come to the following conclusions.

It is considered to be the case that there is a correlation between any indicator obtained on the basis of the amount of included $B_2O_3$ with respect to the amounts of included $SiO_2$, $Al_2O_3$, and $ZrO_2$ of an optical glass and its chemical durability and its devitrification. Accordingly, the relationships between indicators obtained by making various changes in the weightings (i.e. coefficients) with respect to the amounts of included $B_2O_3$, $SiO_2$, $Al_2O_3$, and $ZrO_2$ and the resulting powder method water resistance were investigated. As a result it was determined that, if the value (amount of included $B_2O_3$ component)/(amount of included $SiO_2$ component+amount of included $Al_2O_3$ component×2+ amount of included $ZrO_2$ component×2.5) shown in the above Equation (3) is taken as an indicator, when the value of this indicator was less than or equal to 0.62, then the powder method water resistance rating became 3, whereas, when this indicator value exceeded 0.62, the rating became 4.

Figure 6:
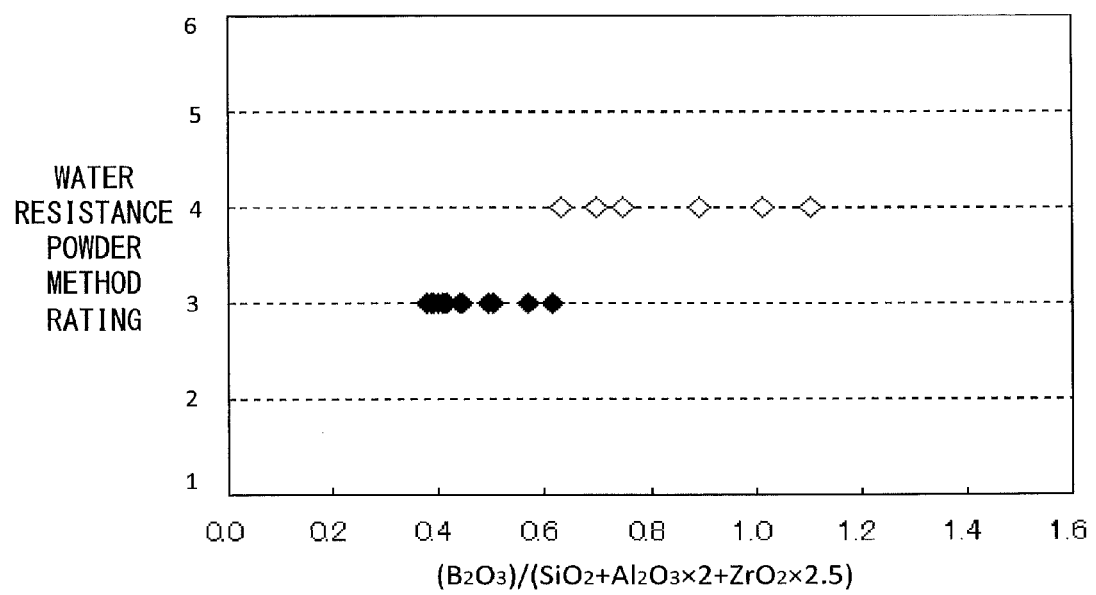
FIG. 6 is a figure showing the chemical durability of the third through the twenty-fourth embodiments.

The relationship between the indicator described above and the rating according to the powder method water resistance test was investigated for the optical glasses of the third through the twenty-fourth embodiments. The results are shown in FIG. 6. In FIG. 6, (amount of included $B_2O_3$ component)/(amount of included $SiO_2$ component+amount of included $Al_2O_3$ component×2+amount of included $ZrO_2$ component×2.5) is shown along the horizontal axis, while the powder method water resistance rating is shown along the vertical axis. As shown in FIG. 6, the plots for the ratios of the amount of included $B_2O_3$ to the total of the amounts of included $SiO_2$, $Al_2O_3$, and $ZrO_2$ having rating 3 (in black color) and for those having rating 4 (in white color) are arranged in steps and do not overlap. In other words, it is seen that optical glasses for which the powder water resistance ratings are 3 can be obtained by making the value of (amount of included $B_2O_3$ component)/(amount of included $SiO_2$ component+amount of included $Al_2O_3$ component×2+ amount of included $ZrO_2$ component×2.5) be less than or equal to 0.62, and that it is possible to separate these from optical glasses whose ratings are 4.

On the other hand it is understood that, if the value of (amount of included $B_2O_3$ component)/(amount of included $SiO_2$ component+amount of included $Al_2O_3$ component×2+ amount of included $ZrO_2$ component×2.5) is less than 0.25, then the optical glasses that are manufactured easily become devitrified. Accordingly, in consideration of the chemical durability of the optical glass being manufactured and of suppression of devitrification thereof, a lower limit value of 0.25 is set for the value of (amount of included $B_2O_3$ component)/(amount of included $SiO_2$ component+amount of included $Al_2O_3$ component×2+amount of included $ZrO_2$ component×2.5). In other words, the range over which the value of (amount of included $B_2O_3$ component)/(amount of included $SiO_2$ component+amount of included $Al_2O_3$ component×2+amount of included $ZrO_2$ component×2.5) is from 0.25 to 0.62 inclusive is set as being a range for the value of this indicator that satisfies both chemical durability of the optical glass and also suppression of devitrification thereof.

The optical glasses of the third through the twenty-fourth embodiments shown in FIGS. 1 through 4 have, as optical characteristics, refractive indexes $n_d$ in the range of 1.54 to 1.61 and Abbe numbers $v_d$ in the range of 50 to 57, and having anomalous dispersion ($\Delta P_{g,F}$)≤−0.004. Furthermore, since λ80 is 380 nm or less with the optical glasses of the third through the twenty-fourth embodiments, accordingly their optical transmittances are satisfactory from the visible light wavelength region to the ultraviolet wavelength region.

Moreover, the powder method water resistance ratings of the optical glasses of the third through the twenty-fourth embodiments are of rating 3. In other words, the optical glasses of the third through the twenty-fourth embodiments have high chemical durability, as compared to optical glasses having a powder method water resistance rating of 4 like the optical glasses of the first, second, fourth, and sixth through eleventh comparison examples shown in FIGS. 7 and 8. Thus, since it is possible to manufacture an optical glass that does not contain any compound that is undesirable in the environment such as PbO or $As_2O_3$, having chemical durability equal to or greater than that of an optical glass according to the prior art, and in which the negative anomalous dispersion is increased, accordingly this can be effective in the design of optical lens systems of various types.

A method of manufacturing the optical glass according to the present invention described above will now be explained. During manufacture of this optical glass, normal optical glass raw materials such as the oxides, carbonates, nitrates, and so on are mixed together in a weighing pan in predetermined proportions. This mixture of glass raw materials is put into a platinum crucible, and is melted for around 3 to 4 hours at a temperature of 1300° to 1450°, according to the degree of difficulty of melting this particular glass composition. And, after the molten glass raw material has been stirred and homogenized, and after it has cooled to an appropriate temperature, it is made into an optical glass by being poured into a mold or the like and annealed.

By processing the optical glass according to the present invention into a desired shape, it may be formed into an optical element such as a lens, a prism, a diffraction grating, a Fresnel lens, a fly-eye lens, or the like. Moreover, according to requirements, it is also possible to arrange to form coatings of various types upon the surfaces of these optical elements. Since the optical glass has $\lambda 80$ as described above, accordingly it becomes possible to manufacture an optical element whose transmittance from the short wavelength side of the visible region into the ultraviolet region is satisfactory.

Furthermore, it is possible to build an optical system by combining an optical element such as that described above with another type of optical glass. Since, as described above, this optical element has a large negative anomalous dispersion from the short wavelength side of the visible region to the ultraviolet region, accordingly this optical system that is manufactured is capable of reducing color aberration in the wavelength range from the visible region to the ultraviolet region.

By using an optical system that employs an optical element according to an embodiment of the present invention, it is possible to manufacture an optical device such as an image capturing device, a microscope, a laser device, an exposure device or the like that employs light in a broad wavelength range from the visible region to the ultraviolet region. In more concrete terms, if an optical system according to the present invention is used as an optical system of a confocal fluorescence microscope that employs excitation light of, for example, the h wavelength line (405 nm), then it is possible to acquire an image of a test sample of a high level of quality and that has high resolution, and in which color aberration is reduced.

Figure 9:
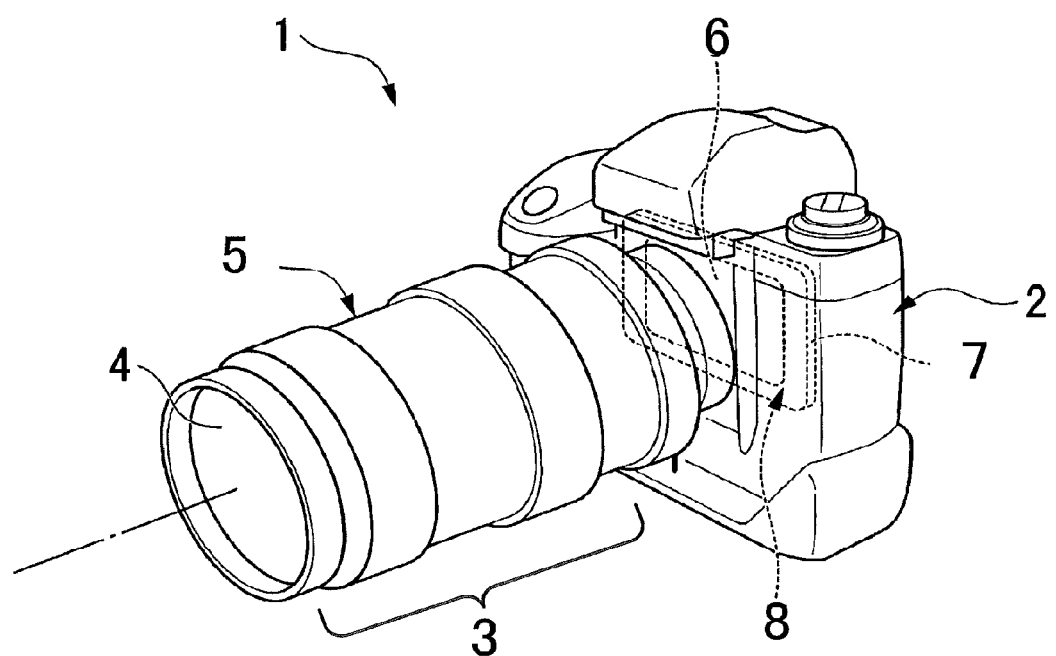
FIG. 9 is a figure showing an example of an optical device incorporating an optical glass according to the present invention.

FIG. 9 shows an image capturing device 1, this being one example of an optical device incorporating a lens that is an optical element manufactured using an optical glass according to the present invention. This image capturing device 1 is a so-called digital single lens reflex camera, and comprises a photographic lens 3 that is detachably attached to a lens mount (not shown in the figure) of a body 2. The photographic lens 3 comprises a lens 4 that consists of a plurality of optical elements, and a lens barrel 5 in which this lens 4 is fixed. And the lens that constitutes an optical element manufactured using an optical glass according to the present invention is installed in the photographic lens 3 as at least one of this plurality of optical elements in the lens 4.

A multi-chip module 8 is provided in the interior of the body 2. This multi-chip module 8 is a module of the COG (Chip On Glass) type in which a bare sensor chip 6 (i.e. a solid imaging element) such as a CMOS image sensor or a CCD image sensor or the like is implemented upon a glass substrate 7. With this image capturing device 1, a ray bundle from a photographic subject that has passed through the lens 4 mounted in the lens barrel 5 is focused into an image upon the sensor chip 6 of the multi-chip module 8. As a result, it is possible to capture an image of high image quality in which color aberration is alleviated. It should be understood that this image capturing device 1 is not limited to being a digital single lens reflex camera; various optical devices having image capture means are included therein, such as an interchangeable lens type camera, a compact camera, a camera for industrial use, a camera module for a smart phone, or the like.

Figure 10:
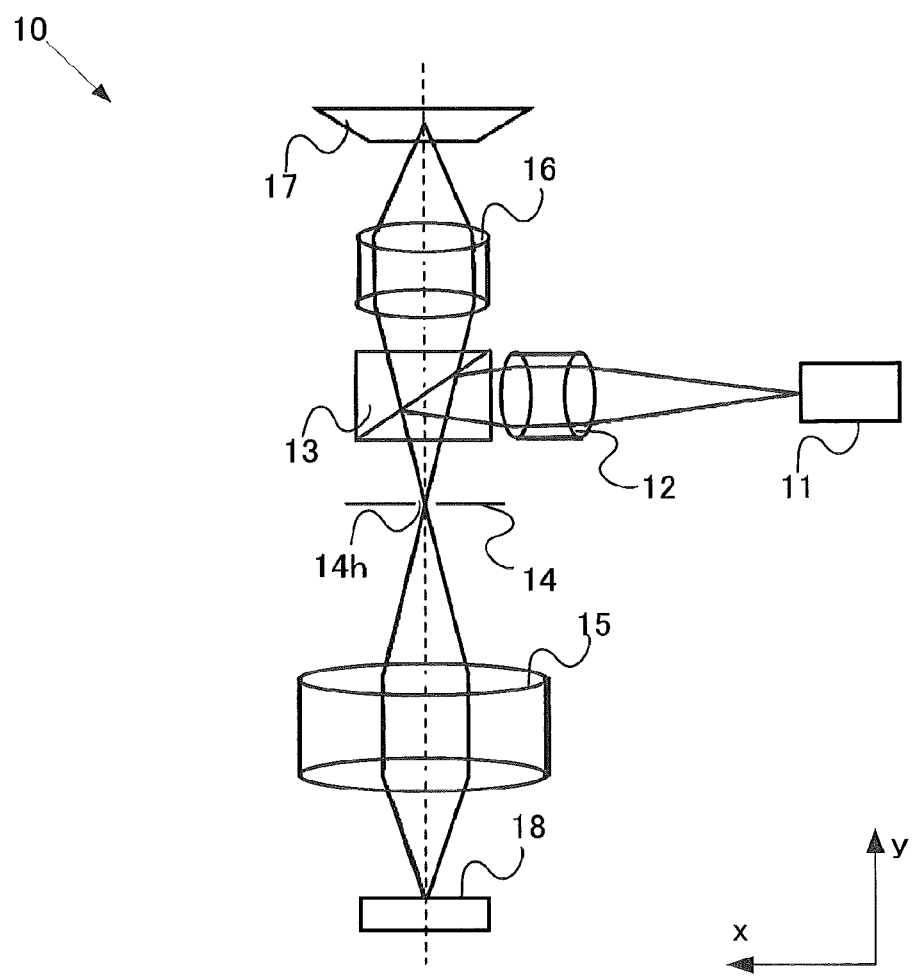
FIG. 10 is a figure showing another example of an optical device incorporating an optical glass according to the present invention.

The structure of the principal portions of a confocal microscope 10 is shown in FIG. 10 as one example of an optical device comprising a lens that is manufactured using an optical glass according to the present invention, and that serves as an optical element. It should be understood that, for the convenience of explanation, a coordinate system based upon an X axis and a Y axis is established as shown in the figure. This confocal microscope 10 comprises a light source 11, an illumination optical system 12, a beam splitter 13, a pin hole mask 14, an objective optical system 15, a relay optical system 16, and a light detector 17. Each of the illumination optical system 12, the objective optical system 15, and the relay optical system 16 comprises a plurality of lenses that constitute optical elements. A lens that is an optical element manufactured using an optical lens according to the present invention is included in at least one of the plurality of lenses constituting the illumination optical system 12, the objective optical system 15, and the relay optical system 16. In particular, the provision of such a lens as a portion of the lenses that make up the objective optical system 15 is desirable from the point of view of reduction of color aberration.

Laser light such as Ar laser light, He—Ne laser light, Kr—Ar laser light or the like is emitted from the light source 11. This laser light proceeds in the direction of the +X axis, is conducted to the beam splitter 13 via the illumination optical system 12, and is reflected in the −Y direction. And the laser light that has been reflected by the beam splitter 13, after having passed through a pin hole 14h that is formed in the pin hole mask 14, is condensed to a single point upon the specimen 18 by the objective optical system 15, and thus is irradiated upon the specimen 18. This laser light that has been irradiated proceeds in the +Y axis direction as light returning from the specimen 18, and is conducted to the pin hole mask 14 via the objective optical system 15. This returning light includes light reflected from the specimen 18, fluorescence, and Raman-scattered light.

The pin hole 14h is provided so as to be conjugate with the position of the focal point of the objective optical system 15, and has an action of passing the fluorescence included in the light returning from the specimen 18. This fluorescence that has passed through the pin hole 14h passes through the beam splitter 13, is condensed by the relay optical system 16, and is focused into an image upon the light detector 17. The light detector 17 is an imaging element that includes a CMOS image sensor or a CCD image sensor or the like, and detects the luminance distribution of the image focused by the relay optical system 16 and outputs this distribution as an image signal. Since, as described above, this confocal microscope 10 incorporates a lens that is an optical element manufactured using an optical glass according to the present invention, accordingly it is possible to acquire a high quality image of the specimen at a high resolution, in which color aberration has been reduced. It should be understood that the structure of the confocal microscope 10 shown in FIG. 10 is only an example; the optical device of the present invention is not to be considered as being limited by the structure shown in the figure.

The present invention is not to be considered as being limited by the embodiments described above; provided that the essential characteristics of the present invention are not departed from, other embodiments that are considered to come within the range of the technical concept of the present invention are also considered to fall within the scope of the present invention.

The content of the disclosure of the following application, upon which priority is claimed, is hereby incorporated herein by reference:

Japanese Patent Application 2012-102,615 (filed on 27 Apr. 2012).

What is claimed is:

1. An optical glass including, in weight percent:
15% to 28% of $SiO_2$;
13% to 31% of $B_2O_3$;
4% to 27% of $Al_2O_3$;
0% to 19% of $Ta_2O_5$;
0% to 10% of $ZrO_2$;
0% to 10% of $Nb_2O_5$;
0% to 5% of MgO;
0% to 12% of ZnO; and
0% to 5% of $Li_2O$;
wherein $Ta_2O_5+Nb_2O_5+ZrO_2 \geq 7.1\%$; and
having optical constants including a refractive index $n_d$ between 1.54 and less than 1.61 and an Abbe number $v_d$ in the range of 50 to 57;
and wherein $\Delta P_{g,F}$ that denotes the anomalous dispersion is −0.004 or less.

2. An optical glass according to claim 1, including:
0% to 4% of $Na_2O$;
0% to 7% of $K_2O$;
0% to 8% of CaO;
0% to 15% of SrO; and
0% to 27% of BaO,
wherein MgO+CaO+SrO+BaO≤29%.

3. An optical glass according to claim 2, wherein,
in oxide based weight percent, the value of (included amount of $B_2O_3$ component)/ (included amount of $SiO_2$ component+included amount of $Al_2O_3$ component×2+ included amount of $ZrO_2$ component×2.5) is between 0.25 and 0.62 inclusive.

4. An optical glass according to claim 2, wherein,
in oxide based weight percent, the value of (included amount of $B_2O_3$ component)/ (included amount of $SiO_2$ component+included amount of $Al_2O_3$ component×2+ included amount of $ZrO_2$ component×2.5) is between 0.25 and 0.62 inclusive, and having a chemical durability of water resistance rating 3 or higher, as measured on the basis of "Method (powder method) for measuring the chemical durability of an optical glass" (Japanese Optical Glass Industrial Standard JOGIS 06-2008).

5. An optical glass according to claim 1, wherein,
for thickness 10 mm, the optical wavelength at which the internal transmittance is 80% is 380 nm or less.

6. An optical element, made from an optical glass according to claim 1.

7. An optical system, comprising an optical element according to claim 6.

8. An optical device, comprising an optical system according to claim 7.

* * * * *

UNITED STATES PATENT AND TRADEMARK OFFICE
CERTIFICATE OF CORRECTION

| | |
|---|---|
| PATENT NO. | : 9,527,766 B2 |
| APPLICATION NO. | : 14/520583 |
| DATED | : December 27, 2016 |
| INVENTOR(S) | : Tetsuya Koide et al. |

Page 1 of 1

It is certified that error appears in the above-identified patent and that said Letters Patent is hereby corrected as shown below:

In the Specification

Column 1, Line 7:
Delete "PCT/JP2013/057528filed" and insert -- PCT/JP2013/057528 filed --, therefor.

Column 1, Line 8:
After "priority" insert -- benefit --, therefor.

Column 1, Line 9:
Delete "7," and insert -- 27, --, therefor.

Signed and Sealed this
Ninth Day of May, 2017

Michelle K. Lee
*Director of the United States Patent and Trademark Office*